UNITED STATES PATENT OFFICE.

AUGUST LACHENMEYER, OF NARROWSBURG, NEW YORK.

IMPROVEMENT IN FINING-SHAVINGS FOR BEER.

Specification forming part of Letters Patent No. 216,868, dated June 24, 1879; application filed February 5, 1879.

*To all whom it may concern:*

Be it known that I, AUGUST LACHENMEYER, of Narrowsburg, in the county of Sullivan, State of New York, have invented a new and useful Improvement in Fining-Shavings for Beer, which is fully set forth in the following specification.

My invention relates to that art which has for its object the clearing or fining of beer of particles of yeast and other impurities; and it consists in taking thin sheets or veneers of maple, birch, beech, or hazelwood, or other similar wood free from gum or resin, of any convenient size, and soaking them in dissolved isinglass or other similar beer-fining ingredients.

These soaked veneers are thrown into the beer-vat. The diluted isinglass covers the veneers with an adhesive coating, and when the said veneers are thrown into the vat the particles in the beer mostly composed of the yeast will deposit themselves on the coated veneers.

When these veneers have performed their function they are removed from the vat and placed in hot water to be cleansed. When so cleansed they are resoaked in dissolved isinglass, and may thus be used several times.

Having thus described my invention, I desire to claim—

A thin sheet or shaving of maple, birch, beech, or hazel, impregnated or coated with isinglass for the clarification of beer, substantially as described.

This specification signed this 18th day of November, 1878.

A. LACHENMEYER.

Witnesses:
CH. RIEGELMAN,
J. BARRITT.